(12) United States Patent
Cai et al.

(10) Patent No.: US 9,547,117 B2
(45) Date of Patent: Jan. 17, 2017

(54) LIGHT GUIDE PLATE

(71) Applicant: RADIANT OPTO-ELECTRONICS CORPORATION, Kaohsiung (TW)

(72) Inventors: Wen-Hao Cai, Kaohsiung (TW); Wei-Hsuan Chen, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 240 days.

(21) Appl. No.: 14/509,100

(22) Filed: Oct. 8, 2014

(65) Prior Publication Data

US 2015/0185392 A1     Jul. 2, 2015

(30) Foreign Application Priority Data

Dec. 26, 2013   (TW) .............................. 102148426 A

(51) Int. Cl.
*F21V 7/04*     (2006.01)
*F21V 8/00*     (2006.01)

(52) U.S. Cl.
CPC ........... *G02B 6/0038* (2013.01); *G02B 6/0016* (2013.01)

(58) Field of Classification Search
CPC ............. G02B 1/00; G02B 1/08; G02B 1/041; G02B 1/045; G02B 6/00; G02B 19/00
See application file for complete search history.

(56) References Cited

U.S. PATENT DOCUMENTS 7,936,411 B2 *   5/2011   Kim .................... G02B 6/002
                                                        349/56

FOREIGN PATENT DOCUMENTS

| CN | 1782818 | 6/2006 |
|----|---------|--------|
| CN | 101276095 | 10/2008 |
| CN | 101329423 | 12/2008 |
| CN | 203720396 | 7/2014 |
| TW | M292707 | 6/2006 |
| TW | 200907441 | 2/2009 |
| TW | I326784 | 7/2010 |
| TW | 201131220 | 9/2011 |
| TW | I363888 | 5/2012 |

OTHER PUBLICATIONS

Search Report for CN App. No. 2014100640671 dated Jul. 13, 2015 (with English translation).
Search Resport of TW Patent Application No. 103135037 (dated Mar. 7, 2016) (w/ translation).

* cited by examiner

*Primary Examiner* — Ali Alavi
(74) *Attorney, Agent, or Firm* — Nixon & Vanderhye P.C.

(57) ABSTRACT

A light guide plate includes a light entry surface with first elongated elements, and a light exit surface with second elongated elements. Each of the first and second elongated elements serves to guide light, and has a cross-section in a shape of a circular segment.

30 Claims, 15 Drawing Sheets

P

P

LIGHT GUIDE PLATE

CROSS-REFERENCE TO RELATED APPLICATION

This application claims priority to Taiwanese Application No. 102148426, filed on Dec. 26, 2013.

BACKGROUND OF THE INVENTION

1. Field of the Invention

The invention relates to a light guide plate, and more particularly to light guide plate with optimal light output efficiency.

2. Description of the Related Art

Liquid crystal displays (LCD) are widely used in consumer electronic products, such as personal digital assistants (PDA), mobile phones, digital cameras, notebook computers, desktop monitors and automotive displays, due to advantages of high image quality, small size, light weight, low driving voltage and low power consumption. An LCD includes a liquid crystal panel at a front side and a backlight module at a rear side thereof. The backlight module may be of edge light type or direct light type. The edge light type backlight module usually includes a light guide plate and a plurality of light emitting diodes (LED) disposed at a side of the light guide plate. The light guide plate converts point light emitted by the LEDs into uniform planar light, thus forming a planar light source required by the LCD.

Recently, LCDs are required to have a slim bezel, resulting in smaller distance between the light guide plate and the LEDs for mixing light emitted by the LEDs, so as to induce hot spots at an edge of the light guide plate proximate to the LEDs in a form of alternating bright and dark regions or jet-stream shapes. In order to solve the hot spot issue, some conventional designs, as shown in FIGS. 1 and 2, have proposed to form, on a light entry surface 11 or a light exit surface 12 of the light guide plate 1, a light guide structure 13 including a plurality of elongated elements 131 disposed side by side, and each of the elongated elements 131 has a cross section in a shape of a circular segment. In another conventional design as shown in FIG. 3, the light guide plate 2 has a light guide structure 23 formed on a light entry surface 21 thereof and a light guide structure 24 formed on a light exit surface 22 thereof. The light guide structure 23 includes a plurality of elongated elements 231 disposed by side, and each of the elongated elements 231 has a cross section in a shape of a circular segment. The light guide structure 24 includes a plurality of triangular prisms 241 disposed side by side.

However, further improvement in light uniformity and light output efficiency at different angles is still desired.

SUMMARY OF THE INVENTION

Therefore, an object of the present invention is to provide a light guide plate that may provide better light uniformity and light output efficiency at different angles.

According to the present invention, a light guide plate comprises:

a light entry surface;

a light exit surface connected to the light entry surface and facing toward a direction different from a direction toward which the light entry surface faces;

a first light guide structure disposed on the light entry surface, and including a plurality of first elongated elements, each of which has a first longitudinal axis parallel to the light entry surface and a cross-section transverse to the first longitudinal axis and in a shape of a first circular segment; and a second light guide structure disposed on the light exit surface, and including a plurality of second elongated elements, each of which has a second longitudinal axis parallel to the light exit surface and a cross-section transverse to the second longitudinal axis and in a shape of a second circular segment.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
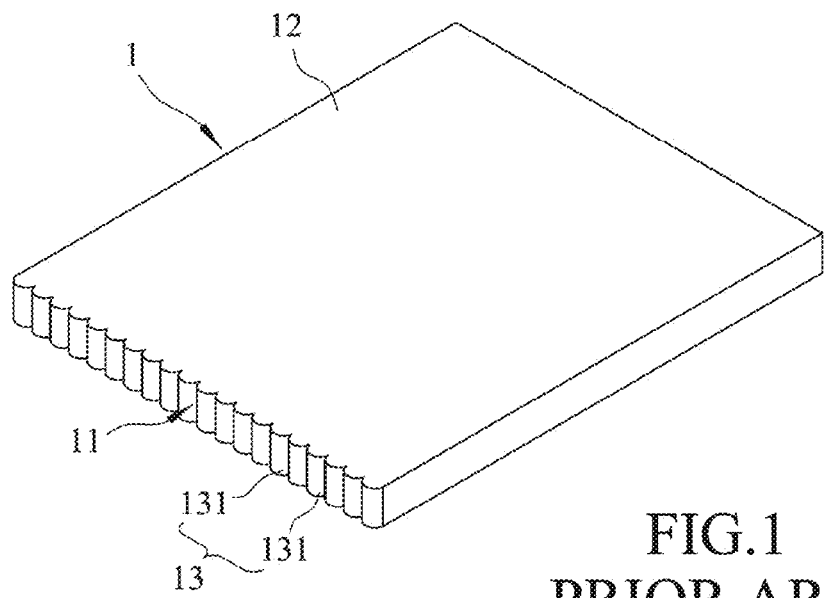
FIG. 1 is a perspective view showing a conventional light guide plate.
Figure 2:
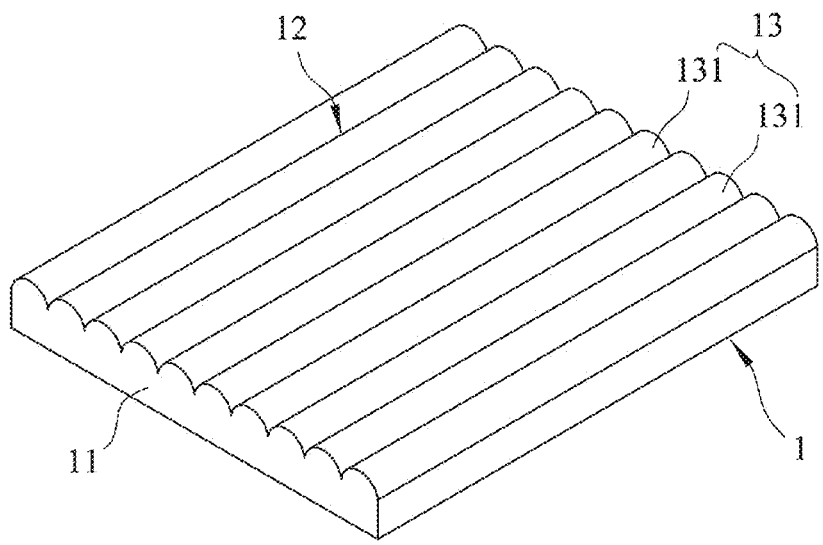
FIG. 2 is a perspective view showing another conventional light guide plate.
Figure 3:
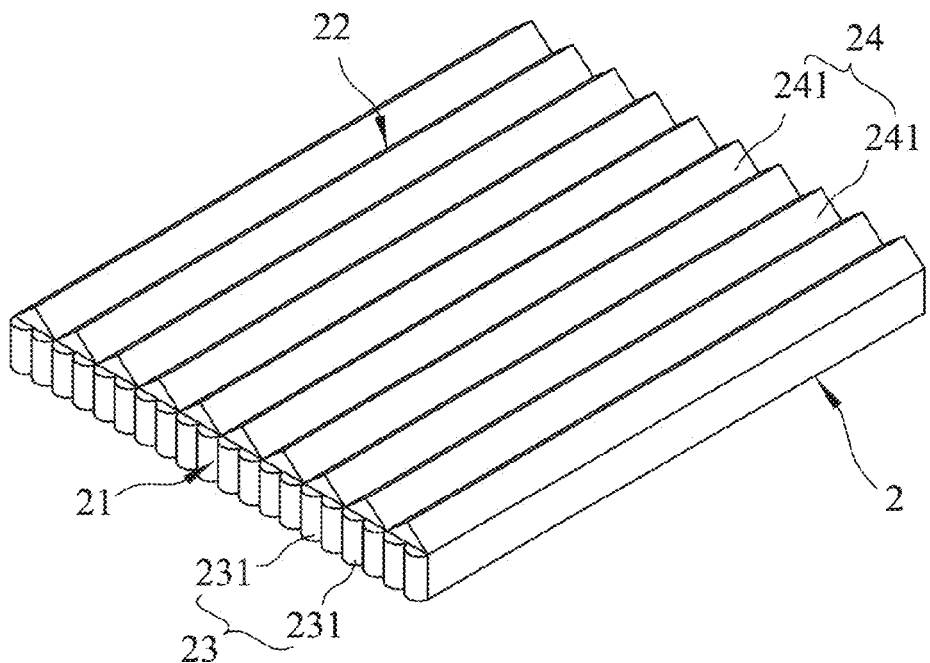
FIG. 3 is a perspective view showing yet another conventional light guide plate.
Figure 4:
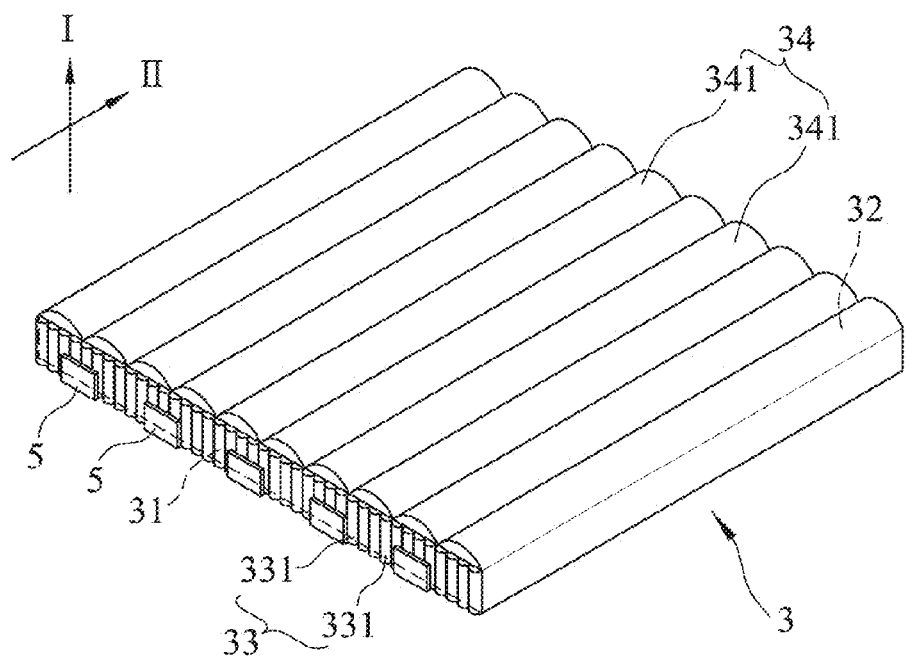
FIG. 4 is a perspective view showing a first preferred embodiment of a light guide plate according to the present invention.
Figure 5A:
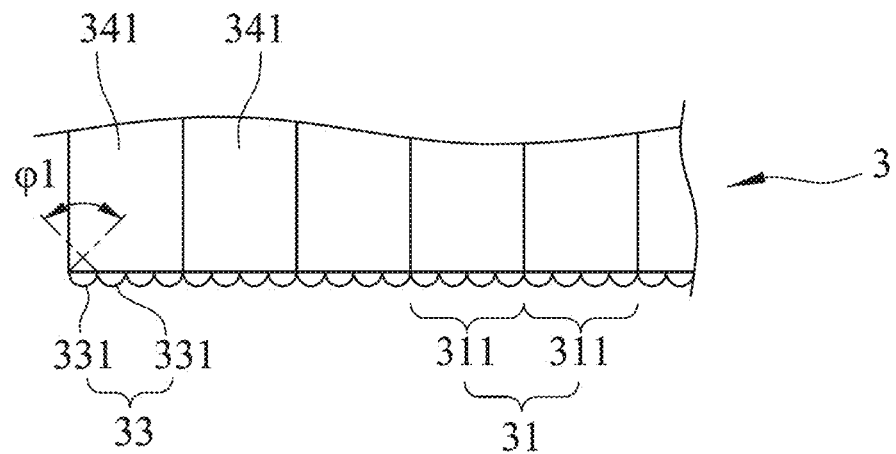
FIGS. 5A and 5B are respectively a fragmentary schematic top view and a fragmentary schematic side view of the first preferred embodiment to illustrate central angles of first and second elongated elements thereof.
Figure 5B:
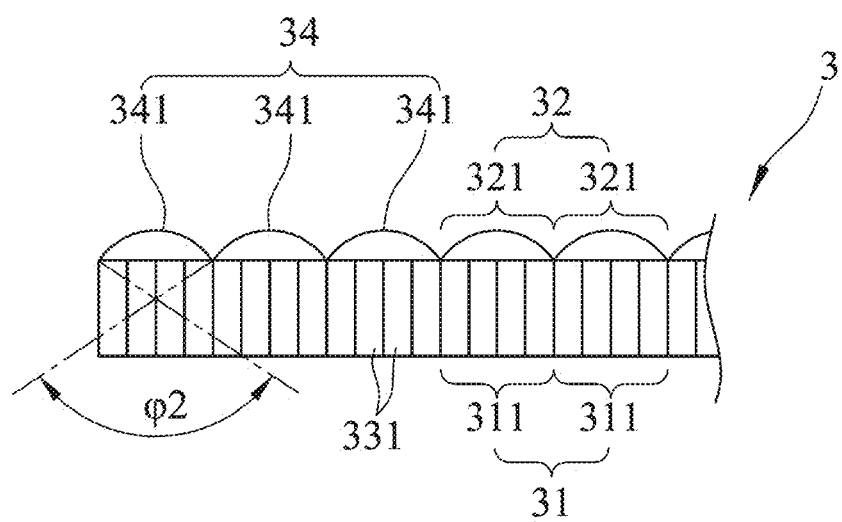

Referring to FIGS. 4, 5A and 5B, the first preferred embodiment of the light guide plate 3 according to this invention is shown to include a light entry surface 31, a light exit surface 32 connected to the light entry surface 31, a first light guide structure 33 disposed on the light entry surface 31, and a second light guide structure 34 disposed on the light exit surface 32. The light entry surface 31 and the light exit surface 32 face toward different directions. The first light guide structure 33 includes a plurality of first elongated elements 331 disposed side by side on the light entry surface 31. Each of the first elongated elements 331 has a first longitudinal axis extending along a first direction (I) and parallel to the light entry surface 31, and a cross-section transverse to the first longitudinal axis and in a shape of a first circular segment with a central angle of φ1. The second light guide structure 34 includes a plurality of second elongated elements 341 disposed side by side on the light exit surface 32. Each of the second elongated elements 341 has a second longitudinal axis extending along a second direction (II) and parallel to the light exit surface 32, and a cross-section transverse to the second longitudinal axis and in a shape of a second circular segment with a central angle of φ2.

The light entry surface 31 has a plurality of first directing units 311. Each of the first directing units 311 has a first width transverse to the first longitudinal axis. In this embodiment, the first elongated elements 331 are arranged on the light entry surface 31 such that multiple first elongated elements 331 are disposed on each of the first directing units 311. The light exit surface 32 has a plurality of second directing units 321. Each of the second directing units 321 has a second width transverse to the second longitudinal axis. In this embodiment, the second elongated elements 341 are arranged on the light exit surface 32 such that only one second elongated element 341 is disposed on each of the second directing units 321. The first width of each of the first directing units 311 corresponds to the second width of a respective one of the second directing units 321.

When the light guide plate 3 is used in an LCD (liquid crystal display, not shown), one or more point light sources 5 may be disposed to emit light toward the light entry surface 31 (i.e., the light entry surface 31 is disposed to correspond in position to the point light sources 5 for receiving light emitted by the light sources 5), so that light emitted by the point light source(s) 5 may enter the light guide plate 3 through the light entry surface 31, and exit the light guide plate 3 through the light exit surface 32. As a result, the point light source(s) 5 may be converted into a planar light source via the light guide plate 3, and the point light source(s) 5 may cooperate with the light guide plate 3 to serve as a backlight module of the LCD.

Figure 6:
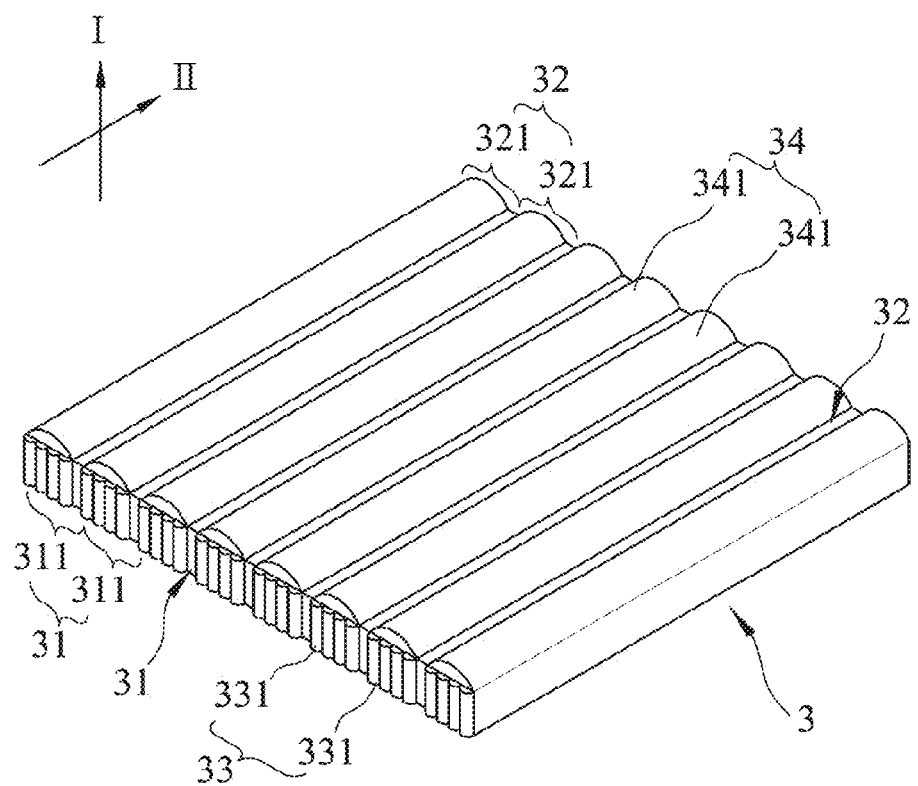
FIG. 6 is a perspective view showing a second preferred embodiment of a light guide plate according to the present invention.

Referring to FIG. 6, the second preferred embodiment of the light guide plate 3 according to the present invention is similar to the first preferred embodiment, and differs in that: the first elongated elements 331 of each of the first directing units 311 are disposed side by side on the light entry surface 31, but the first elongated elements 331 on one of the first directing units 311 are spaced apart from the first elongated elements 331 on an adjacent one of the first directing units 311 in a direction transverse to the first longitudinal axis; and adjacent ones of the second elongated elements 341 are spaced apart from each other in a direction transverse to the second longitudinal axis.

Figure 7:
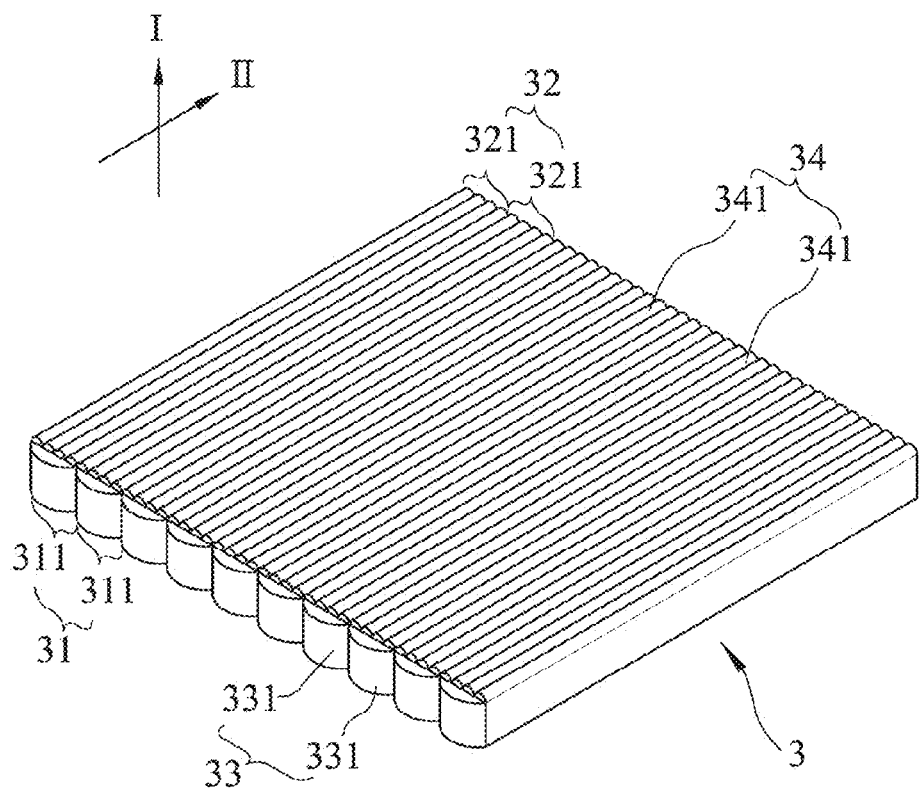
FIG. 7 is a perspective view showing a third preferred embodiment of a light guide plate according to the present invention.

Referring to FIG. 7, the third preferred embodiment of the light guide plate 3 according to the present invention is similar to the first preferred embodiment, and differs in that: the first elongated elements 331 are arranged on the light entry surface 31 such that only one first elongated element 331 is disposed on each of the first directing units 311, and the second elongated elements 341 are arranged on the light exit surface 32 such that multiple second elongated elements 341 are disposed on each of the second directing units 321.

Figure 8:
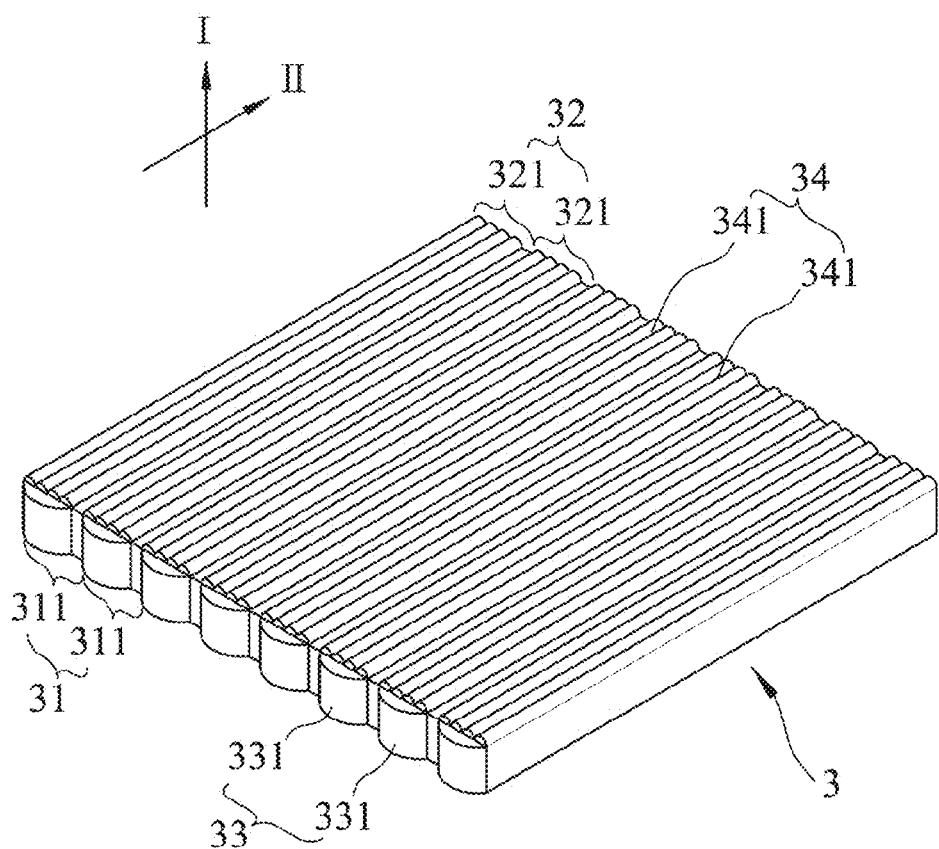
FIG. 8 is a perspective view showing a fourth preferred embodiment of a light guide plate according to the present invention.

Referring to FIG. 8, the fourth preferred embodiment of the light guide plate 3 according to the present invention is similar to the third preferred embodiment, and differs in that: adjacent ones of the first elongated elements 331 are spaced apart from each other in a direction transverse to the first longitudinal axis; and the second elongated elements 341 of each of the second directing units 321 are disposed side by side on the light exit surface 32, but the second elongated elements 341 on one of the second directing units 321 are spaced apart from the second elongated elements 341 on an adjacent one of the second directing units 321 in a direction transverse to the second longitudinal axis.

Figure 25:
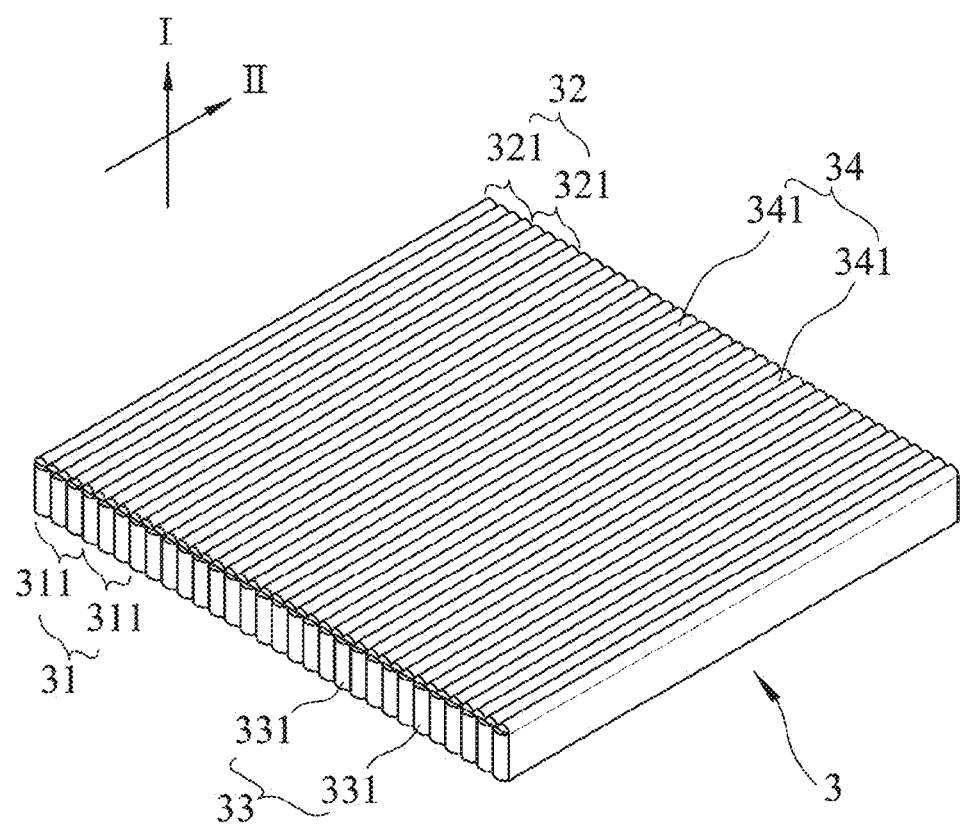
FIG. 25 is a perspective view showing a modification of the light guide plate according to the present invention.

It is noted that arrangements of the first and second elongated elements 331, 341 according to the present invention should not be limited to the embodiments disclosed herein. As an example, adjacent first elongated elements 331 may be spaced apart from each other, adjacent second elongated elements 341 may be spaced apart from each other, and/or each of the first elongated elements 331 may correspond to a respective one of the second elongated elements 341. In addition, the present invention is not limited to that each of the first directing units 311 and/or each of the second directing units 321 has only one first or second elongated element 331, 341 disposed thereon, which are shown in FIGS. 4-8. In some embodiments, each of the first directing units 311 has a plurality of the first elongated elements 331 disposed thereon, and each of the second directing units 321 has a plurality of the second elongated elements 341 disposed thereon, as shown in FIG. 25.

Figure 21:
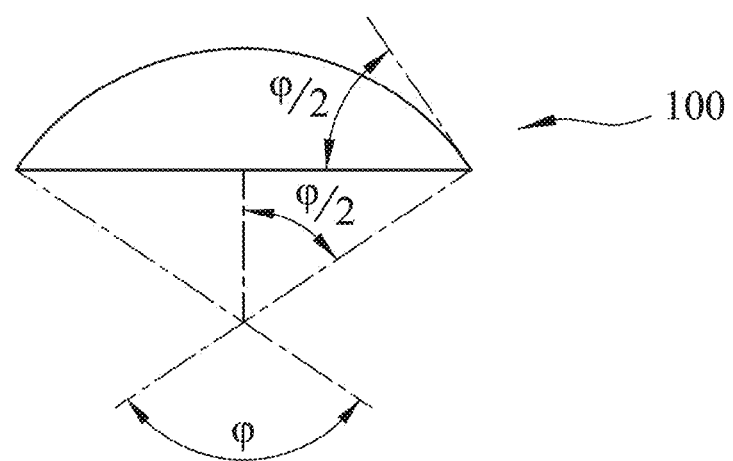
FIG. 21 is a schematic diagram to illustrate some parameters of a circular segment.

Referring to FIG. 21, a circular segment 100 with a central angle (φ) is shown to illustrate some parameters for the first and second circular segments. Note that a contact angle of the circular segment 100 is equal to half of the central angle of the circular segment 100, i.e., the contact angle of the circular segment 100 is equal to φ/2. The circular segment 100 has a peak index P=1−cos(φ/2). It addition, the first to fourth preferred embodiments of the light guide plate 3 according to this invention satisfy a relationship of:

$$1.25 \times 10^{-4} < R1 \times P1 \times R2 \times P2 < 2.5 \times 10^{-2} \tag{1}$$

where R1 represents a first pattern ratio of the light entry surface 31, which is a ratio of a total area of the light entry surface 31 occupied by the first elongated elements 331 of the first light guide structure 33 disposed thereon to an area of the light entry surface 31, P1 represent a peak index of the first circular segment, R2 represents a second pattern ratio of the light exit surface 32, which is a ratio of a total area of the light exit surface 32 occupied by the second elongated elements 341 of the second light guide structure 34 disposed thereon to an area of the light exit surface 32, and P2 represents a peak index of the second circular segment. Preferably, $2.5 \times 10^{-1} < R1 \times P1 < 1$ and $5 \times 10^{-4} < R2 \times P2 < 2.5 \times 10^{-2}$. The detailed explanation of the first and second pattern ratios R1, R2 are exemplified hereinafter using the second preferred embodiment (see FIG. 6).

Figure 9:
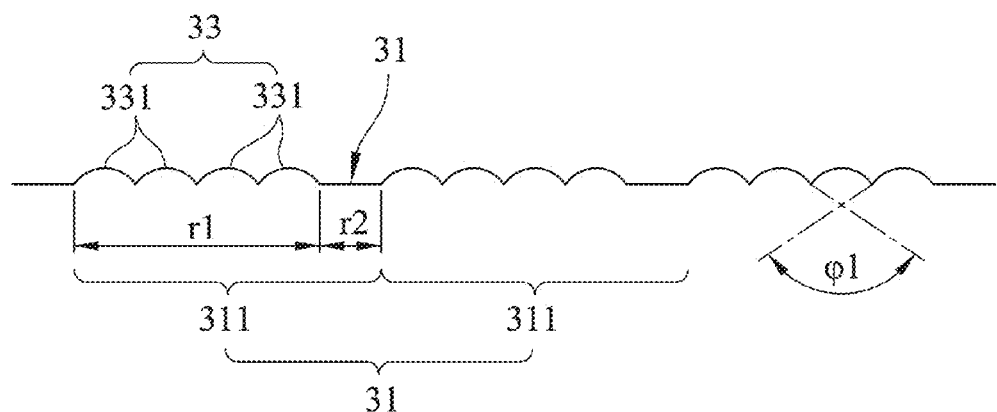
FIG. 9 is a schematic diagram to illustrate a pattern ratio of a first light guide structure of the second preferred embodiment.

FIG. 9 is a schematic diagram of the first light guide structure 31 of the second preferred embodiment (see FIG. 6) to illustrate the first pattern ratio R1 of the light entry surface 31. The first width of the first directing unit 311 is equal to a sum of widths of the first elongated elements 331 thereon (i.e., a width r1), and a distance between the first elongated elements 331 on adjacent first directing units 311 (i.e., a width r2). A ratio $R_{311}$ of a total width of each of the first directing units 311 occupied by the first elongated elements 331 disposed thereon to the first width of each of the first directing units 311 is defined according to:

$$R_{311} = \frac{r1}{r1+r2}$$

Figure 23:
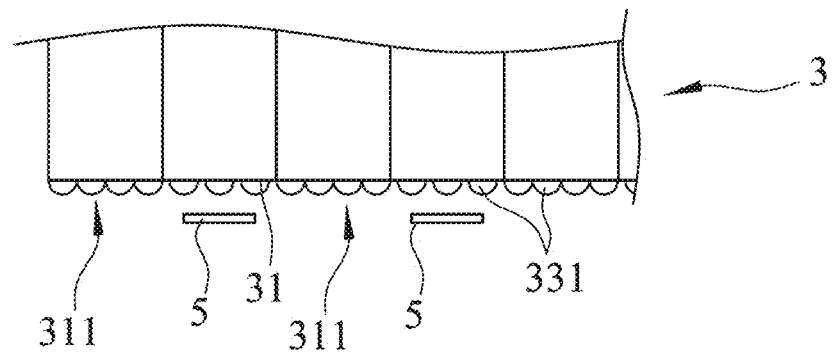
FIG. 23 is a schematic diagram to illustrate a variation of an arrangement of the first elongated elements.

Particularly, the width r1 refers to a total width of the first elongated elements 331 at portions contacting the light entry surface 31. In this embodiment, since all of the first directing units 311 have the same arrangement of the first elongated elements 331 and are uniformly arranged, the first pattern ratio R1 is equal to $R_{311}$. As an example, assuming r1=0.8 of the first width and r2=0.2 of the first width, the first pattern ratio R1=0.8. As to the first and third preferred embodiments (see FIGS. 4 and 7) where the adjacent first elongated elements 331 are disposed side by side on the light entry surface 31, r1 is equal to the first width, r2=0, and the first pattern ratio R1=1. In other embodiments, at least one of the first directing units 311 may have an arrangement of the first elongated elements 331 disposed thereon different from that of another one of the first directing units 311, as shown in FIG. 23. In FIG. 23, an area of a portion of the light entry surface 31 adjacent to the light sources 5 is defined to be a first light entry portion (i.e., the first directing units 311 that have three first elongated elements 331 disposed thereon), and a portion of the light entry surface 31 other than the first light entry portion is defined to be a second light entry portion (i.e., the first directing units 311 that have four first elongated elements 331 disposed thereon). Preferably, a ratio of a total area of the first light entry portion occupied by the first elongated elements 331 to an area of the first light entry portion is smaller than a ratio of a total area of the second light entry portion occupied by the first elongated elements 331 to an area of the second light entry portion. Since the elongated elements may assist in enhancement of luminance of the light guide plate 3, the first light entry portion, which receives more light due to being closer to the light sources 5 than the second light entry portion, is preferable to have a density of the first elongated elements 331 disposed thereon lower than that of the second light entry portion in order to alleviate non-uniformity of luminance of the light guide plate 3.

Figure 10:
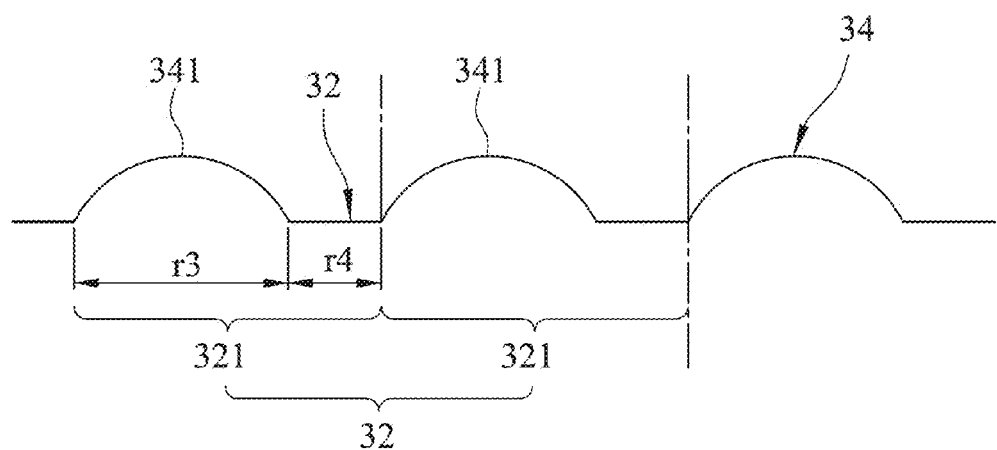
FIG. 10 is a schematic diagram to illustrate a pattern ratio of a second light guide structure of the second preferred embodiment.

FIG. 10 is a schematic diagram of the second light guide structure 32 of the second preferred embodiment (see FIG. 6) to illustrate the second pattern ratio R2 of the light exit surface 32. The second width of the second directing unit 321 is equal to a sum of a width of the second elongated element 341 thereon (i.e., a width r3), and a distance between the second elongated elements 341 on adjacent second directing units 321 (i.e., a width r4). A ratio $R_{321}$ of a total width of each of the second directing units 321 occupied by the second elongated elements 341 disposed thereon to the second width of each of the second directing units 321 is defined according to:

$$R_{321} = \frac{r3}{r3+r4}$$

Figure 24:
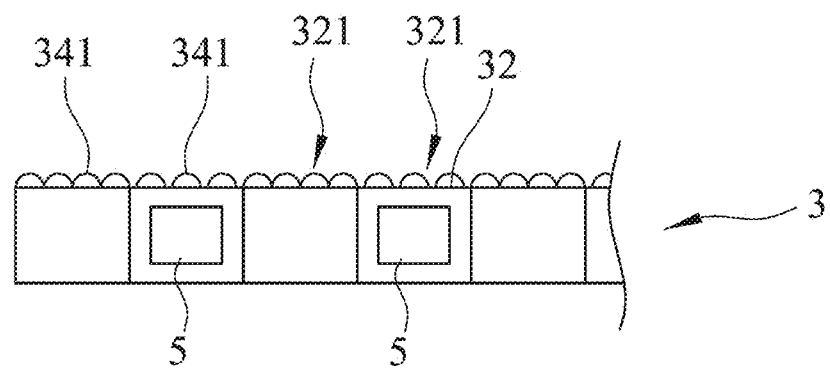
FIG. 24 is a schematic diagram to illustrate a variation of an arrangement of the second elongated elements.

Particularly, the width r3 refers to a width of the second elongated element 341 at a portion contacting the light exit surface 32. In this embodiment, since all of the second directing units 321 have the same arrangement of the second elongated elements 341 and are uniformly arranged, the first pattern ratio R2 is equal to $R_{321}$. As an example, assuming r3=0.7 of the second width and r4=0.3 of the second width, the second pattern ratio R2=0.7. As to the first and third preferred embodiments (see FIGS. 4 and 7) where the adjacent second elongated elements 341 are disposed side by side on the light exit surface 32, r3 is equal to the second width, r4=0, and the second pattern ratio R2=1. In other embodiments, at least one of the second directing units 321 may have an arrangement of the second elongated elements 341 disposed thereon different from that of another one of the second directing units 321, as shown in FIG. 24. In FIG. 24, an area of a portion of the light exit surface 32 adjacent to the light sources 5 is defined to be a first light exit portion (i.e., the second directing units 321 that have three second elongated elements 341 disposed thereon), and a portion of the light exit surface 32 other than the first light exit portion is defined to be a second light exit portion (i.e., the second directing units 321 that have four second elongated elements 341 disposed thereon). Preferably, a ratio of a total area of the first light exit portion occupied by the second elongated elements 341 to an area of the first light exit portion is smaller than a ratio of a total area of the second light exit portion occupied by the second elongated elements 341 to an area of the second light exit portion. Since the elongated elements may assist in enhancement of luminance of the light guide plate 3, the first light exit portion, which receives more light due to being closer to the light sources 5 than the second light exit portion, is preferable to have a density of the second elongated elements 341 disposed thereon lower than that of the second light exit portion in order to alleviate non-uniformity of luminance of the light guide plate 3.

Figure 22:
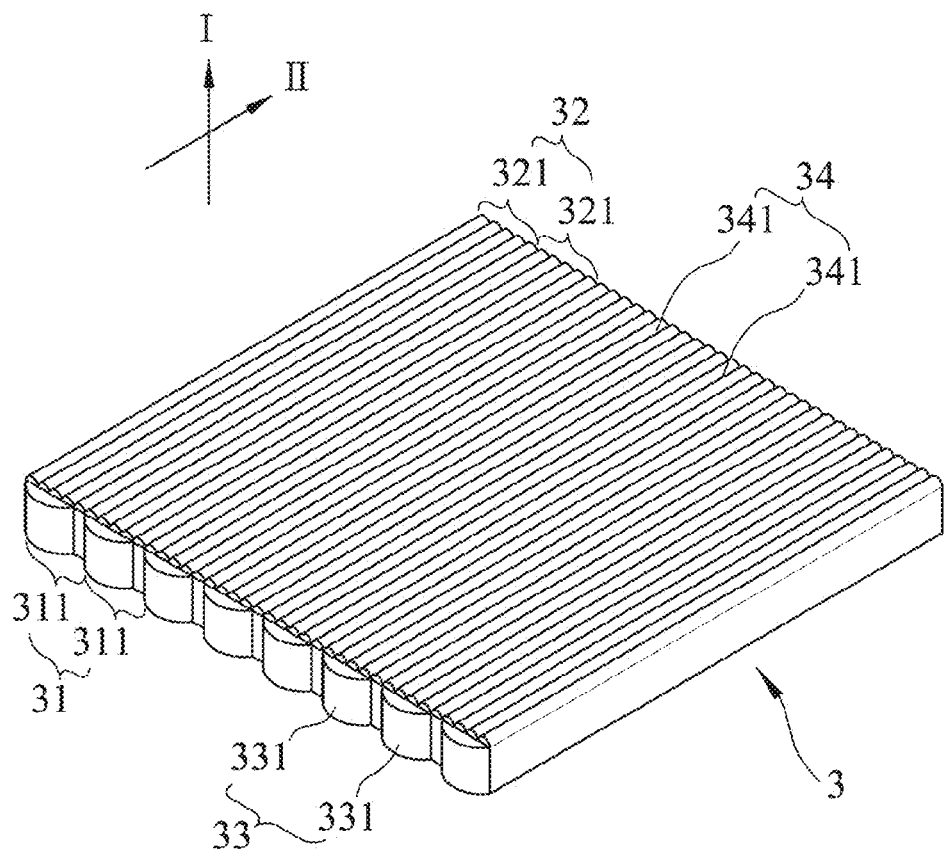
FIG. 22 is a schematic diagram to illustrate a modification of the preferred embodiments.

For the light guide plate 3 shown in each of FIGS. 4, 7 and 25, both of the first and second pattern ratios R1 and R2 are equal to 1. For the light guide plate 3 shown in each of FIGS. 6 and 8, both of the first and second pattern ratios R1 and R2 are smaller than 1. However, in some embodiments, one of the first and second pattern ratios R1, R2 may be equal to 1, and the other one of the first and second pattern ratios R1, R2 may be smaller than 1, as shown in FIG. 22.

FIGS. 11 to 20 show light fields in edge lighting experiments using different parameters of the pattern ratios R1, R2 and the central angles that satisfy the relationship (1), and are arranged in an order of R1×P1×R2×P2 from a value close to the lower limit $1.25 \times 10^{-4}$ to a value close to the upper limit $2.5 \times 10^{-2}$, where P represents a location of a light source.

Figure 11:
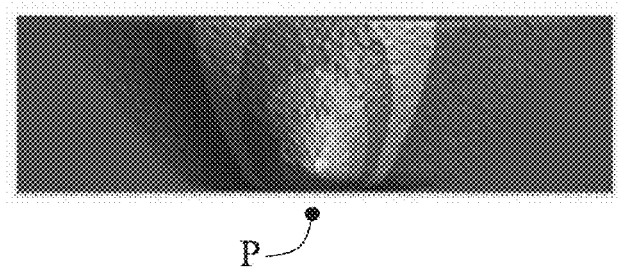
FIGS. 11 to 20 are schematic diagrams respectively showing a light field on a light exit surface of different light guide plates configured with different parameters.
Figure 12:
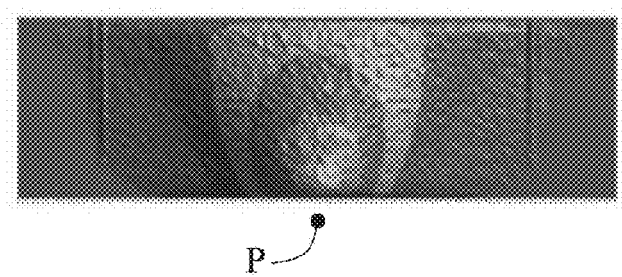
Figure 13:
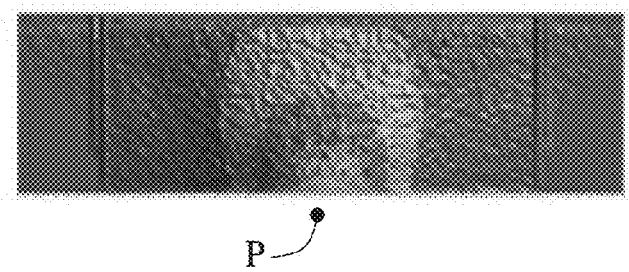
Figure 14:
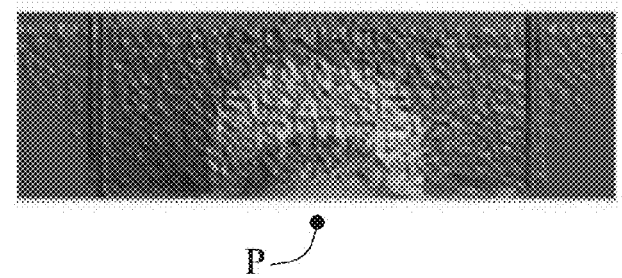
Figure 15:
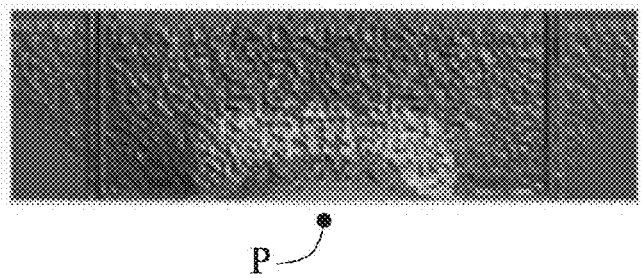
Figure 16:
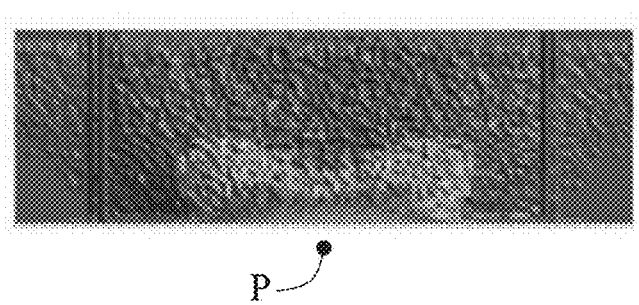
Figure 17:
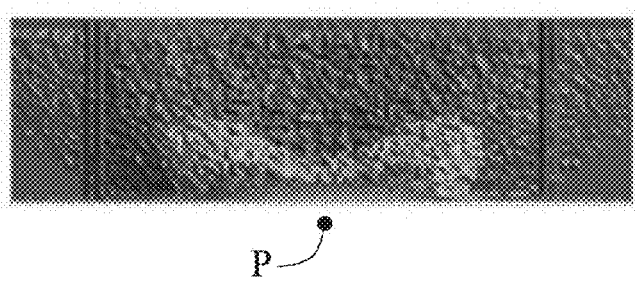
Figure 18:
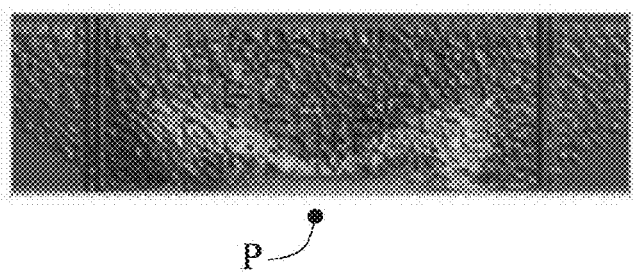
Figure 19:
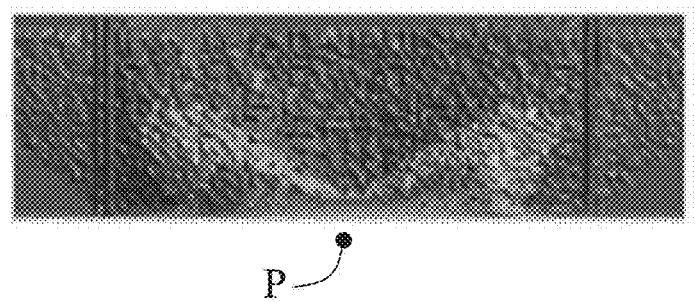
Figure 20:
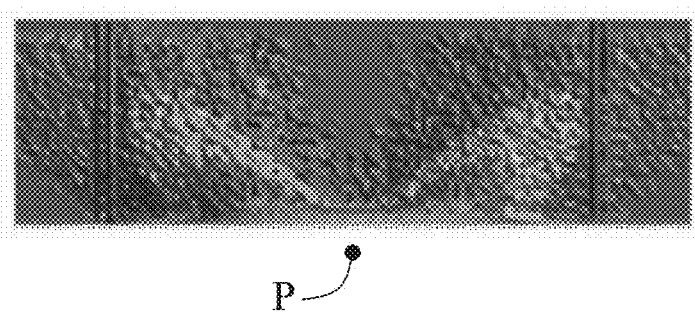

When R1×P1×R2×P2 is close to the lower limit $1.25 \times 10^{-4}$ of the relationship (1), a corresponding light field would be presented as FIGS. 11 and 12, which is like a light field of an ordinary point light source and which has poor light uniformity. When R1×P1×R2×P2 is in a middle range between the lower and upper limits of the relationship (1), a corresponding light field would be presented as FIGS. 13 to 18, which is like a gradient formed by diffusion and which has good light uniformity. When R1×P1×R2×P2 is close to the upper limit $2.5 \times 10^{-2}$ of the relationship (1), a corresponding light field would be presented as FIGS. 19 and 20, which is like a jet stream and which has poor light uniformity.

To sum up, by virtue of the abovementioned first and second light guide structures 33 and 34, light uniformity and light output efficiency at different angles may be enhanced. A number of the light emitting diodes used as light sources may be reduced, and the light guide plate with the abovementioned light guide structures 33, 34 may be suitable for use in a narrow bezel of a backlight module while alleviating the hot spot issue.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light guide plate comprising:
a light entry surface;
a light exit surface connected to said light entry surface and facing toward a direction different from a direction toward which said light entry surface faces;
a first light guide structure disposed on said light entry surface, and including a plurality of first elongated elements, each of which has a first longitudinal axis parallel to said light entry surface and a cross-section transverse to the first longitudinal axis and in a shape of a first circular segment; and
a second light guide structure disposed on said light exit surface, and including a plurality of second elongated elements, each of which has a second longitudinal axis parallel to said light exit surface and a cross-section transverse to the second longitudinal axis and in a shape of a second circular segment,
wherein:
said light entry surface has a plurality of first directing units, each of said first directing units having a first width transverse to the first longitudinal axis;
said first elongated elements are arranged on said light entry surface such that at least one of said first elongated elements is disposed on each of said first directing units;
said light exit surface has a plurality of second directing units, each of said second directing units having a second width transverse to the second longitudinal axis; and
said second elongated elements are arranged on said light exit surface such that at least one of said second elongated elements is disposed on each of said second directing units,
said light guide plate satisfying $1.25 \times 10^{-4} < R1 \times P1 \times R2 \times P2 < 2.5 \times 10^{-2}$, where R1 represents a ratio of a total area of said light entry surface occupied by said first elongated elements of said first light guide structure disposed thereon to an area of said light entry surface, P1 represents a peak index of said first circular segment and is equal to $1-\cos(\phi1/2)$, $\phi1/2$ represents a contact angle of said first circular segment, R2 represents a ratio of a total area of said light exit surface occupied by said at least one of said second elongated elements of said second light guide structure disposed thereon to an area of said light exit surface, P2 represents a peak index of said second circular segment and is equal to $1-\cos(\phi2/2)$, and $\phi2/2$ represents a contact angle of said second circular segment.

2. The light guide plate as claimed in claim 1, wherein all of said second directing units have the same arrangement of said at least one of said second elongated elements disposed thereon.

3. The light guide plate as claimed in claim 1, wherein at least one of said second directing units has an arrangement of said at least one of said second elongated elements disposed thereon different from that of another one of said second directing units.

4. The light guide plate as claimed in claim 1, wherein said light entry surface is disposed to correspond in position to at least one light source for receiving light emitted by the at least one light source, an area of a portion of said light exit surface to be adjacent to the at least one light source being defined to be a first light exit portion, a portion of said light exit surface other than said first light exit portion being defined to be a second light exit portion, a ratio of a total area of said first light exit portion occupied by said second elongated elements to an area of said first light exit portion being smaller than a ratio of a total area of said second light exit portion occupied by said second elongated elements to an area of said second light exit portion.

5. The light guide plate as claimed in claim 1, further satisfying $2.5 \times 10-1 < R1 \times P1 < 1$ and $5 \times 10-4 < R2 \times P2 < 2.5 \times 10-2$.

6. The light guide plate as claimed in claim 1, wherein at least one of R1 and R2 is smaller than 1.

7. The light guide plate as claimed in claim 1, wherein the first width of each of said first directing units corresponds to the second width of a respective one of said second directing units, each of said first directing units has one of said first elongated elements disposed thereon, and each of said second directing units has a plurality of said second elongated elements disposed thereon.

8. The light guide plate as claimed in claim 7, wherein said first elongated elements are disposed side by side on said light entry surface.

9. The light guide plate as claimed in claim 7, wherein said second elongated elements are disposed side by side on said light exit surface.

10. The light guide plate as claimed in claim 9, wherein said first elongated elements are disposed side by side on said light entry surface.

11. The light guide plate as claimed in claim 7, wherein adjacent ones of said first elongated elements are spaced apart from each other in a direction transverse to the first longitudinal axis.

12. The light guide plate as claimed in claim 7, wherein said second elongated elements on one of said second directing units are spaced apart from said second elongated elements on an adjacent one of said second directing units in a direction transverse to the second longitudinal axis.

13. The light guide plate as claimed in claim 12, wherein adjacent ones of said first elongated elements are spaced apart from each other in a direction transverse to the first longitudinal axis.

14. The light guide plate as claimed in claim 1, wherein the first width of each of said first directing units corresponds to the second width of a respective one of said second directing units, each of said first directing units has a plurality of said first elongated elements disposed thereon, and each of said second directing units has one of said second elongated elements disposed thereon.

15. The light guide plate as claimed in claim 14, wherein said first elongated elements are disposed side by side on said light entry surface.

16. The light guide plate as claimed in claim 14, wherein said second elongated elements are disposed side by side on said light exit surface.

17. The light guide plate as claimed in claim 16, wherein said first elongated elements are disposed side by side on said light entry surface.

18. The light guide plate as claimed in claim 14, wherein said first elongated elements on one of said first directing units are spaced apart from said first elongated elements on an adjacent one of said first directing units in a direction transverse to the first longitudinal axis.

19. The light guide plate as claimed in claim 18, wherein adjacent ones of said second elongated elements are spaced apart from each other in a direction transverse to the second longitudinal axis.

20. The light guide plate as claimed in claim 14, wherein adjacent ones of said second elongated elements are spaced apart from each other in a direction transverse to the second longitudinal axis.

21. The light guide plate as claimed in claim 1, wherein said first elongated elements are disposed side by side on said light entry surface.

22. The light guide plate as claimed in claim 1, wherein said second elongated elements are disposed side by side on said light exit surface.

23. The light guide plate as claimed in claim 22, wherein said first elongated elements are disposed side by side on said light entry surface.

24. The light guide plate as claimed in claim 1, wherein adjacent ones of said first elongated elements are spaced apart from each other in a direction transverse to the first longitudinal axis.

25. The light guide plate as claimed in claim 1, wherein adjacent ones of said second elongated elements are spaced apart from each other in a direction transverse to the second longitudinal axis.

26. The light guide plate as claimed in claim 25, wherein adjacent ones of said first elongated elements are spaced apart from each other in a direction transverse to the first longitudinal axis.

27. The light guide plate as claimed in claim 1, wherein the first width of each of said first directing units corresponds to the second width of a respective one of said second directing units, each of said first directing units has a plurality of said first elongated elements disposed thereon, and each of said second directing units has a plurality of said second elongated elements disposed thereon.

28. The light guide plate as claimed in claim 1, wherein all of said first directing units have the same arrangement of said at least one of said first elongated elements disposed thereon.

29. The light guide plate as claimed in claim 1, wherein at least one of said first directing units has an arrangement of said at least one of said first elongated elements disposed thereon different from that of another one of said first directing units.

30. The light guide plate as claimed in claim 1, wherein said light entry surface is disposed to correspond in position to at least one light source for receiving light emitted by the at least one light source, an area of a portion of said light entry surface to be adjacent to the at least one light source being defined to be a first light entry portion, a portion of said light entry surface other than said first light entry portion being defined to be a second light entry portion, a ratio of a total area of said first light entry portion occupied by said first elongated elements to an area of said first light entry portion being smaller than a ratio of a total area of said second light entry portion occupied by said first elongated elements to an area of said second light entry portion.

\* \* \* \* \*